July 4, 1950 — A. SILFEN — 2,513,591

LAWN MOWER SHARPENER

Filed Dec. 11, 1946

Inventor
ALFRED SILFEN
By: Fred Gerlach, Atty.

Patented July 4, 1950

2,513,591

UNITED STATES PATENT OFFICE 2,513,591

LAWN MOWER SHARPENER

Alfred Silfen, Berkeley, Ill., assignor to
Norman H. Gerlach, Chicago, Ill.

Application December 11, 1946, Serial No. 715,583

1 Claim. (Cl. 76—82.1)

This invention relates to law mower sharpeners of the type shown and described in my U. S. Patent No. 2,327,827, granted August 24, 1943; and my primary object is to modify and improve the sharpener of the above-identified patent, as well as other similar sharpeners, in such manner that it may be applied to lawn mower brush bars of various widths and made slidably to fit the brush bar, irrespective of the width thereof, so that the mower blade guide will remain at a fixed distance from the brush bar during the blade-sharpening movements of the sharpener, thus ensuring a uniform bevel on each cutter blade, without necessitating the exercise of skill in the manipulation of the sharpener.

Other objects of the invention and the various advantages and characteristics of the present lawn mower sharpener will be apparent from a consideration of the following detailed description.

A preferred embodiment of my invention is illustrated in the accompanying drawing, wherein.

Figure 1:
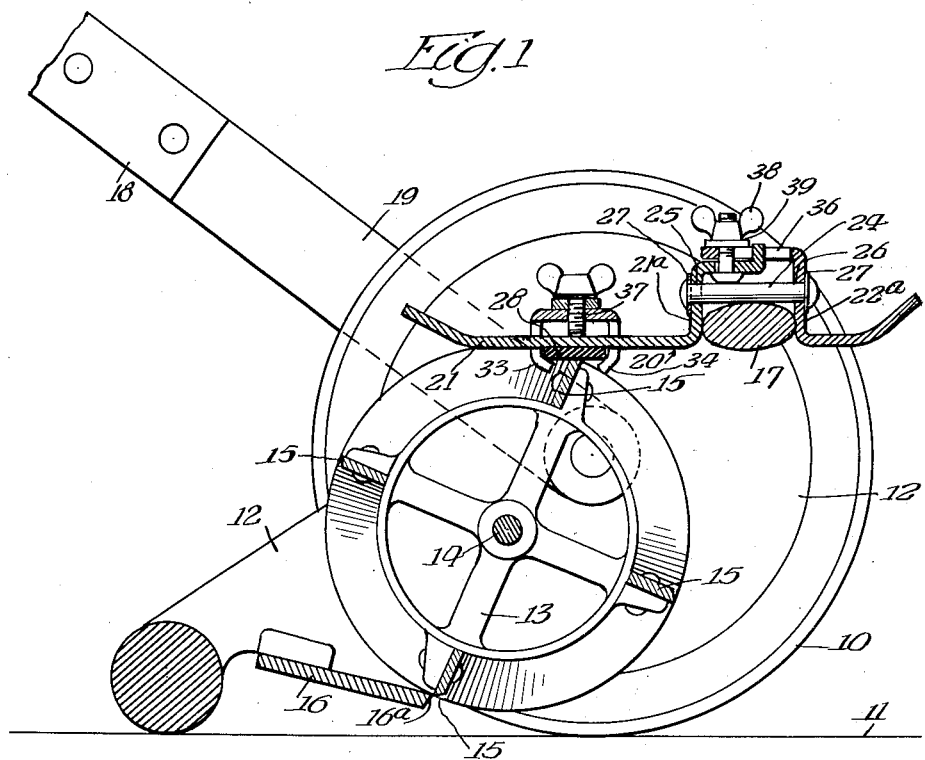
Fig. 1 is a vertical sectional view of a conventional lawn mower, to which is shown applied a sharpener in accordance with the invention.
Figure 2:
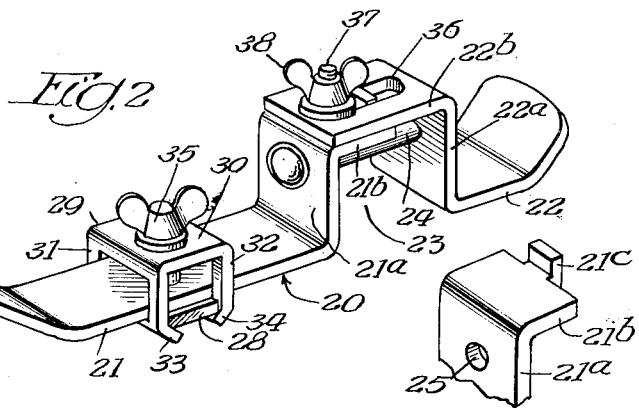
Fig. 2 is a perspective view of my improved sharpener.

Referring to Fig. 1, the conventional lawn mower therein shown comprises the usual laterally spaced wheels 10 which rest on the lawn surface 11 and are journaled in a pair of laterally spaced frame members 12. A rotor 13 mounted on and driven by a shaft 14 spans the space between frame members 12 and carries at its periphery four equally spaced cutter blades 15 having the usual helical formation lengthwise of the rotor. A cutter bar 16 is bridged between the two frame members 12 and affixed thereto and has a cutting edge 16a disposed in co-operative relation to the cutting edges of blades 15. Shaft 14 is connected through suitable gearing to one or both wheels 10 and rotates in the same direction as the wheels.

The two frame members 12 are tied together in spaced relation by cutter bar 16 and a brush bar 17. The latter extends parallel to shaft 14 and is connected at its ends to the respective frame members.

The lawn mower is provided with the usual handle 18 which is pivotally connected to the frames by means of a yoke 19.

A free-wheeling device, not shown, permits rotor 13 to rotate in a clockwise direction, as viewed in Fig. 1, independently of wheels 10.

The improved sharpener includes a two-piece bar 20 comprising metal strips 21 and 22 which are bent to form, conjointly, an inverted U-shaped guide or bridge portion 23 which, as shown in Fig. 1, is adapted to overlie and straddle the brush bar 17.

A rod 24 of circular cross-section is loosely journaled at its two ends in aligned holes 25 and 26 in the two vertical portions 21a and 22a of the inverted U-shaped guide and is headed over at its ends to secure a pair of washers 27 which serve to hold said rod in place. Rod 24 functions as a roller bearing and is designed to rest upon the top surface of brush bar 17. It facilitates movement of the sharpener lengthwise of the brush bar in the course of the blade-sharpening operation and serves permanently to connect the strips 21 and 22.

A short flat file 28 is secured to the under side of strip 21 by means of a clamp 29 comprising a horizontal top portion 30 and two parallel vertical spaced wall portions 31 and 32 which terminate at their lower ends in angularly extending ears 33 and 34. The latter embrace opposite edges of file 28 and serve to support the same in clamping engagement with the under surface of strip 21. The two vertical wall portions 31 and 32 are provided with rectangular openings to accommodate strip 21; and the top portion 30 is tapped to receive a thumb screw 35, the lower end of which is adapted to bear against the top surface of strip 21 whereby to apply an upwardly directed force to clamp 29.

Upon loosening thumb screw 35, clamp 29, together with file 28, can be moved lengthwise of strip 21, and by so doing the file can be positioned so as to produce the desired bevel or clearance angle on the cutter blades 15. This adjustment is necessary in order to adapt the sharpener for use on lawn mowers which differ from one another as respects the location of the brush bar relatively to the rotor.

The ends of ears 33 and 34 are so spaced as to enable file 28 to be brought into contact with a cutter blade, but they are situated so close to the respectively adjacent sides of the blade that they function as guides to keep the blade properly oriented in relation to the file as the sharpener is moved lengthwise of the blade; and since each blade is disposed helically with respect to the axis of rotation of the rotor, said ears cause the rotor to rotate to such extent as to keep that portion of the blade which is being operated upon at any instant in proper angular relation to the file. Thus, the clearance angle or bevel on each cutter blade is kept uniform from end to end.

The brush bar 17 is not of any fixed or standard width, as viewed in Fig. 1, but varies considerably as between different makes and models of lawn-mowers. But it is desirable that the sharpener be maintained in a fixed position laterally of the brush bar because any substantial movement thereof crosswise of the rotor 13 will alter the angularity of the bevel on the cutter blade being sharpened, and, for that reason, may result in a defective sharpening job.

For the purpose of adapting the sharpener to brush bars of various widths, I have provided an adjustable connection between metal strips 21 and 22 which enables the spacing between vertical portions 21a and 22a to be altered in conformity with the width of the particular brush bar to which the device is to be connected, thus making it possible to obtain a close running fit on the brush bar, irrespective of its width.

Figures 3, 4:
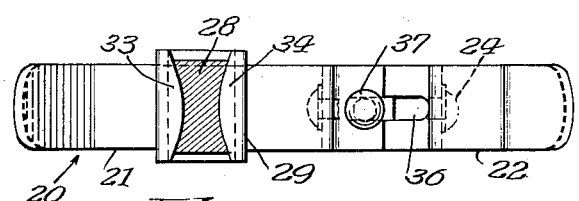
Fig. 3 is a bottom view of the sharpener.
Fig. 4 is a fragmentary perspective view emphasizing a detail which is not shown with sufficient clarity in the other figures of the drawing.

The adjustable connection is effected by overlapping the contiguous end portions 21b and 22b of the two metal strips 21 and 22 and by providing the end portion 22b with an elongate slot 36 through which extends a vertical clamping bolt 37. The latter extends through a hole in the central portion of the end portion 21b and is equipped with a wing nut 38, together with a washer 39. As shown in the drawing the clamp bolt is arranged so that the wing nut is at the top and its head is at the bottom. The head of the bolt rests on the rod 24 and hence the latter serves to hold the bolt against axial displacement with respect to the end portions 21b and 22b. Bolt 37 and wing nut 38 are effective to clamp together the two overlapped end portions 21b and 22b. As shown most clearly in Fig. 4, the end portion 21b is provided with an upstanding ear 21c which slidably fits slot 36 and thus serves, in conjunction with bolt 37, to hold the two strips 21 and 22 in alignment.

Roller 24 is long enough to permit the vertical portions 21a and 22a to be separated sufficiently to embrace the widest brush bar likely to be encountered, and enough longer so that the washers 27 will not interfere with free rotation of the roller when said vertical portions are spaced apart to the maximum extent.

With the sharpener adjusted freely to fit the brush bar laterally, and the clamp 29 positioned so as to produce an appropriate clearance angle or bevel, the operator has only to apply the sharpener to the mower in the manner depicted in Fig. 1 and then move it back and forth along the brush bar. In so doing he may conveniently grip the two slightly upturned ends of bar 20. He does not need to observe any precaution against movements of the sharpener laterally of the rotor because that is prevented by virtue of the fact that the sharpener has been adjusted closely to fit the brush bar laterally.

It will be apparent to persons skilled in the art that there are numerous possible modifications and alternative embodiments within the scope and purview of my herein described invention, and I, accordingly, do not wish to be limited except as indicated by the terms of the appended claim.

Having described my invention, what I claim as new and desire to secure by Letters Patent is:

As a new article of manufacture, a sharpener adapted for use in sharpening the blades of a conventional lawn mower with a blade equipped rotor and a brush bar above and forwards of the rotor, and comprising an elongated two-piece frame consisting of a first flat metal strip adapted when the sharpener is in use to extend substantially horizontally and having its outer end shaped to form a handle and its inner end bent upwards at right angles and then outwards at right angles to form a substantially vertical side portion and a substantially horizontal top portion, and a second flat metal strip arranged in longitudinal alignment with the first strip, having the outer end thereof shaped to form a handle and its inner end bent upwards at right angles and then outwards at right angles to form a substantially vertical side portion and a substantially horizontal top portion, and arranged so that the top portion thereof is in lapped relation with the top portion of the first strip and also so that its side and top portions define with the side and top portions of said first strip an inverted U-shaped brush bar receiving guide, a connection operative to connect the two strips so that they may be slidably adjusted toward one another in order to vary the width of said guide and consisting of a longitudinally extending closed ended slot in one of the top portions and a vertically extending nut equipped bolt extending through the slot and a hole in the top portion of the other strip, and arranged so that the head thereof is at the bottom and the nut is at the top, a roller type brush bar engaging rod disposed beneath and lengthwise of said top portions, positioned so that it underlies the head of the bolt and holds the bolt in place, extending loosely through holes in the upper ends of said side portions, embodying abutment forming heads at its ends, and serving to hold the two strips in permanently connected relation while at the same time permitting the strips to be slidably adjusted to and from one another, and means on, and adjustable longitudinally of, the intermediate portion of one of said strips for retaining a blade sharpening file against the bottom face of said intermediate portion and also guiding the blade at the top of the rotor with respect to the file during use of the sharpener.

ALFRED SILFEN.

REFERENCES CITED

The following references are of record in the file of this patent:

UNITED STATES PATENTS

| Number | Name | Date |
|---|---|---|
| 617,584 | Leshure | Jan. 10, 1899 |
| 1,359,192 | Palas | Nov. 16, 1920 |
| 1,489,492 | Gardner | Apr. 8, 1924 |
| 2,327,827 | Silfen | Aug. 24, 1943 |